US006711321B2

(12) United States Patent
Helin et al.

(10) Patent No.: US 6,711,321 B2
(45) Date of Patent: Mar. 23, 2004

(54) MECHANICAL OPTICAL SWITCH AND METHOD FOR MANUFACTURING THE SAME

(75) Inventors: Philippe Helin, Tokyo (JP); Makoto Mita, Tokyo (JP); Hiroyuki Fujita, Tokyo (JP)

(73) Assignee: Japan Science and Technology Corporation, Kawaguchi (JP)

( * ) Notice: Subject to any disclaimer, the term of this patent is extended or adjusted under 35 U.S.C. 154(b) by 7 days.

(21) Appl. No.: 09/926,152

(22) PCT Filed: Jan. 17, 2001

(86) PCT No.: PCT/JP01/00260

§ 371 (c)(1),
(2), (4) Date: Sep. 13, 2001

(87) PCT Pub. No.: WO01/53874

PCT Pub. Date: Jul. 26, 2001

(65) Prior Publication Data

US 2002/0159683 A1 Oct. 31, 2002

(30) Foreign Application Priority Data

Jan. 20, 2000 (JP) .......................................... 2000-12087

(51) Int. Cl.$^7$ ................................................ G02B 6/26
(52) U.S. Cl. ........................................................ 385/19
(58) Field of Search ................................. 359/224, 128; 385/18, 19, 16

(56) References Cited

U.S. PATENT DOCUMENTS 4,626,066 A * 12/1986 Levinson ..................... 385/22

FOREIGN PATENT DOCUMENTS

| GB | 2 097 550 | 11/1982 | |
| GB | 2097550 A | * 11/1982 | ............ G02B/7/26 |
| JP | 57-139704 | 8/1982 | |
| JP | WO 87/02475 | 4/1987 | |
| JP | 63-501384 | 5/1988 | |
| JP | 01292308 A | * 11/1989 | ........... G02B/26/08 |
| JP | 11-119123 | 4/1999 | |

OTHER PUBLICATIONS

Marxer et al., Vertical Mirrors Fabricated by Deep Reactive Ion Etching for Fiber–Optic Switching Applications, Sep. 1997, IEEE, Journal of Microelectromechanical Systems, vol. 6, No. 3, pp. 277–285.*

C. Marxer et al. "*Vertical Mirrors Fabricated by Deep Reactive Ion Etching for Fiber–Optic Switching Application*"—Journal of Microelectromechanical System, vol. 6, No. 3, Sep. 1997—pp 277–285.

Han et al. "*Refractive Plate Optical Switches using Off–Axis V–Groove Arrays for Fiber Positioning*"—EEP–vol. 19–1, ASME 1997—pp. 765–771.

* cited by examiner

*Primary Examiner*—Audrey Chang
*Assistant Examiner*—Denise S. Allen
(74) *Attorney, Agent, or Firm*—Westerman, Hattori, Daniels & Adrian, LLP

(57) ABSTRACT

A mechanical optic switch is disclosed that is of high mirror quality, high in the accuracy of opto-axial alignment between a mirror and a fiber aligning structure and yet of low insertion loss, permitting fiber optic switching by an electromagnetic force. It is made by a crystallographically oriented face dependent etching process, which simultaneously forms in a Si (100) crystallographically faced single crystal substrate (1), V-grooves (3) for fixing optical fibers (2, 2a, 2b, 2c, 2d) with the V-groove's longitudinal axes oriented in the <110> crystallographic direction or in a direction equivalent thereto; and a resilient support beam (5) and a mirror (4, 6) with the longitudinal axis of the resilient support beam and the mirror surface of the mirror oriented in the <100> direction or in a direction equivalent thereto. Slitting into the substrate from a rear surface thereof by etching renders the support beam resilient and flexible.

12 Claims, 11 Drawing Sheets

Light input

Light output

MECHANICAL OPTICAL SWITCH AND METHOD FOR MANUFACTURING THE SAME

TECHNICAL FIELD

This invention relates to optic switches for use in building an optical communication network and, more particularly, to a mechanical optic switch for controlling optical coupling among a plurality of optical fibers by mechanically moving or repositioning a mirror and also to a method of manufacturing such an optic switch.

BACKGROUND ART

Rapid growth of fiber optic communication networks has been giving rise to demands for numerous optical components including optic switches. A low-cost optical component is important for a large-scale communication network and a local area network (LAN) which rest on optical fibers.

Of late, interests have been taken in the use of micromachining technique to improve the performance, and to reduce the cost, of a mechanical optic switch. Of especial importance is the ability of the micro-machining technique to manufacture a large number of optical matrix switches capable of switching among their inputs and outputs one to another, integrally on a single chip. Such an optical matrix switch is a most important component that is wanted in a dynamically reformable, high density, wavelength division, multiplex communication network.

In the conventional optic switch, there are a plurality of mutually different primary factors or causes which deteriorate its performance. A matrix switch, in which errors and uncertainties included in these factors and causes cumulate to deteriorate its performance, has greater impact from such factors and causes than a single switch. Of those factors and causes, the most important is seen from an optical standpoint. Indeed, conventional optic switches have several problems, one of which is that because of their poor mirror surface quality they are unusable in an application that requires multiple reflection. Another problem is that when made up of individual components such as optical fibers and a mirror in combination, a conventional optic switch is insufficient in the accuracy of alignment with an optical axis between the mirror and fiber orienting structures. Thus, for each of the optical fibers, fine adjustment is required of its optical axis with the result that these fine adjustments are costly.

Employing Si micromachining technique can solve these problems. However, while optic switches have so far been made by the conventional micromachining technique by using deep excavating reactive ion etching, surface micromachining or bulk micromachining, no mechanical optic switch has as yet been obtained that is of enough performance.

For example, optic switches made by deep excavating reactive ion etching have the problem that they have ripples (wavy irregularities) formed on their vertical surfaces, which when they are used as mirrors cause an increase in optical loss.

An optic switch has also been made by surface micromachining. While an optic switch by surface micromachining is manufactured by opto-axially aligning a mirror, microlenses and optical fibers, subtle variations caused for an optical axis every manufacture, which call for aligning the optical axis for each of the components of an optic switch manufactured in advance of its utilization, make it impossible to manufacture a large number of such optic switch products in a batch work without requiring fine axial adjustments.

It may also be noted that bulk micromachining makes it possible to form an optical component self-aligned in accordance with a crystallographically oriented face dependent etching process.

To make an optic switch by the use of bulk micromachining, while it has indeed been reported to so micromachine a (110) crystallographic face silicon wafer and then to use its (111) face vertical wall for a mirror, it has not been made possible to form a V-groove for fiber alignment.

As another example of forming an optic switch by the use of bulk micromachining, it has been reported to use a (100) face silicon wafer and then to form both a mirror and a fiber aligning structure self-aligned and to use its (100) face vertical wall for the mirror. However, while this can be used to provide such a passive device as a beam splitter, the same has been inapplicable to a mechanical switch having a mirror made mechanically movable to controllably establish optical coupling between two of a plurality of optical fibers.

In sum, therefore, it has so far been altogether difficult to manufacture a mechanical optic switch with input and output optical fibers and a movable mirror in opto-axial alignment with due accuracy. Consequently, the problem has been had of necessitating fine opto-axial pre-adjustments of the optic switch before its use. The problem has also been had that insufficiency in mirror surface smoothness causes large insertion loss.

This invention is provided to solve the above-mentioned problems met in the prior art and has for its first object to provide a mechanical optic switch that is high in the accuracy of opto-axial alignment for a mirror and a fiber aligning structure and yet is low in insertion loss.

A second object of this invention is to provide a method of its manufacture that makes its production cost dramatically low.

DISCLOSURE OF THE INVENTION

In order to achieve the first object mentioned above, there is provided in accordance with the present invention, a mechanical optic switch, characterized in that it comprises a groove for fixing an optical fiber, and a movable mirror, wherein the said groove and the said mirror are those formed simultaneously in a single crystal substrate in accordance with a crystallographically oriented face dependent etching process.

In the construction mentioned above, the said groove for fixing an optical fiber may be a V-groove, and the said movable mirror may comprise a resilient support beam capable of flexing or deflection and a mirror made integrally with the said resilient support beam.

Further, the said V-groove may be formed of a Si (111) crystallographic face and the said mirror may have a mirror surface formed of a Si (100) crystallographic face.

The construction mentioned above makes it possible for the optical axes of such optical fiber fixing grooves and the movable mirror to be established independently of the accuracy of etching masks and the time period of etching but at an accuracy as determined by the accuracy of crystallographic faces' orientations, thus permitting the optical fibers and the mirror to be aligned opto-axially at high accuracy. Moreover, the mirror surface formed by crystallographically oriented face dependent etching is flat and even at the accuracy of a crystallographically oriented face and therefore reduces the loss of light to a minimum.

Further, the ability for the resilient support beam to be deflected by an external force applied thereto enables the mirror surface selectively to come out of the optical axis of an optical fiber, which in turn enables the optical path to be altered one to another among a plurality of optical fibers and also to be restored by removing the external force; hence optical switching operations made possible.

Further, in the mechanical optic switch according to the present invention, the said movable mirror may have a permanent magnet disposed on a rear surface of the said resilient support beam capable of flexing, and a drive coil or a yoke including drive coil that is disposed beneath the said permanent magnet and adapted to be supplied with an electric current to create a magnetic field for driving the said movable mirror.

Still further, the switch may be so constructed that adding the permanent magnet to the said yoke including drive coil establishes a pair of stable positions for the said resilient support beam having the permanent magnet disposed on the rear surface thereof, and that directionally reversing the electric current passed through the said coil selectively establishes one of the said two stable positions.

According to this construction, a magnetic field is created by the drive coil when an energizing current is turned on therethrough. And, the resilient support beam is then deflected by the virtue of this magnetic field exerted on the magnet attached thereto to bring the mirror surface out of the optical axes of the optical fibers, thus changing the optical path among a plurality of optical fibers from one to another. Also, removing the magnetic field by turning the energizing current off though the drive coil causes the resilient support beam to restore its undeflected position by its elastic restoring energy and returns the mirror to its original position, thus returning the optical path among the optical fibers to the original. Therefore, an optical switching operation is made possible.

Also, the construction in which a permanent magnet is added to a drive coil or a yoke including drive coil permits the drive coil to be supplied with energizing current only at the moment at which one of the two stable states corresponding to the ON and OFF of the optic switch is switched to the other. Consequently, there becomes possible optical switching with a minimum consumption of electric power.

In order to achieve the second object above, the present invention provides a method of manufacturing a mechanical optic switch, which method is characterized in that it comprises applying a crystallographically oriented face dependent etching process to simultaneously form in a Si (100) crystallographically faced single crystal substrate, a V-groove for fixing an optical fiber and a movable mirror made of an resilient support beam and a mirror.

In the construction mentioned above, the crystallographically oriented face dependent etching process is performed after there has been formed on the said Si (100) crystallographically faced single crystal substrate, an etching mask pattern comprising a region of rectangular open pattern for the said resilient support beam, a region of rectangular masking pattern in the said region of rectangular open pattern for the said mirror, and a plurality of regions of open pattern for such V-grooves as aforesaid.

Also, in the construction mentioned above, the said region of rectangular open pattern for the said resilient support beam and the said region of rectangular masking pattern in the said region of rectangular open pattern for the said mirror may each be of a rectangle lying in a (100) crystallographic plane and having one side oriented in a <100> crystallographic direction or in a direction equivalent thereto and other side perpendicular to the said one side.

The said plurality of regions of rectangular open pattern for V-grooves are each a region of rectangular open pattern lying in the (100) crystallographic plane and having a longitudinal axis oriented in the <100> crystallographic direction or in a direction equivalent thereto and are each arranged having the said longitudinal axis directed towards a center of the said region of masking pattern for the said mirror and are so arranged as to surround the said region of rectangular open pattern for the said resilient support beam.

Also, a slit corresponding in shape and depth to the shape and thickness of the said resilient support beam is made by etching from a rear surface of the said single crystal substrate to render the said support beam resilient and capable of flexing or deflection.

According to this construction, the open pattern for the resilient support beam and the rectangular masking pattern in this open pattern for the mirror permit the (100) crystallographic face or a face equivalent thereto to be kept exposed for etching and allow etching to proceed both in the direction of depth and sideways. And, controlling the etching time period makes it possible to form monolithically or in one piece both a mirror with a mirror surface constituted by the (100) crystallographic face and having a predetermined thickness and a support beam portion becoming a resilient support beam having a shape and a thickness predetermined. This etching operation may either be preceded or followed by slitting by etching from the rear side of the single crystal substrate to separate from the single crystal substrate the periphery of the support beam portion except for its base portion, namely a region where the resilient support beam is connected to the single crystal substrate. This renders the support beam portion resilient and capable of deflection, becoming the resilient support beam or cantilever beam. The V-grooves, each of which is composed by the (111) crystallographic face or a face equivalent thereto are formed with a shape as determined by the width of the open etching pattern alone and essentially independent of the etching time period.

In this manner, the method according to the present invention of manufacturing a mechanical optic switch can be used to produce a mechanical optic switch of the present invention at a dramatically reduced production cost.

BRIEF DESCRIPTION OF THE DRAWINGS

The present invention will better be understood from the following detailed description and the drawings attached hereto showing certain illustrative forms of embodiment of the present invention. In this connection, it should be noted that such forms of embodiment illustrated in the accompanying drawings hereof are intended in no way to limit the present invention but to facilitate an explanation and understanding thereof.

In the drawings.

BEST MODES FOR CARRYING OUT THE INVENTION

Figure 1:
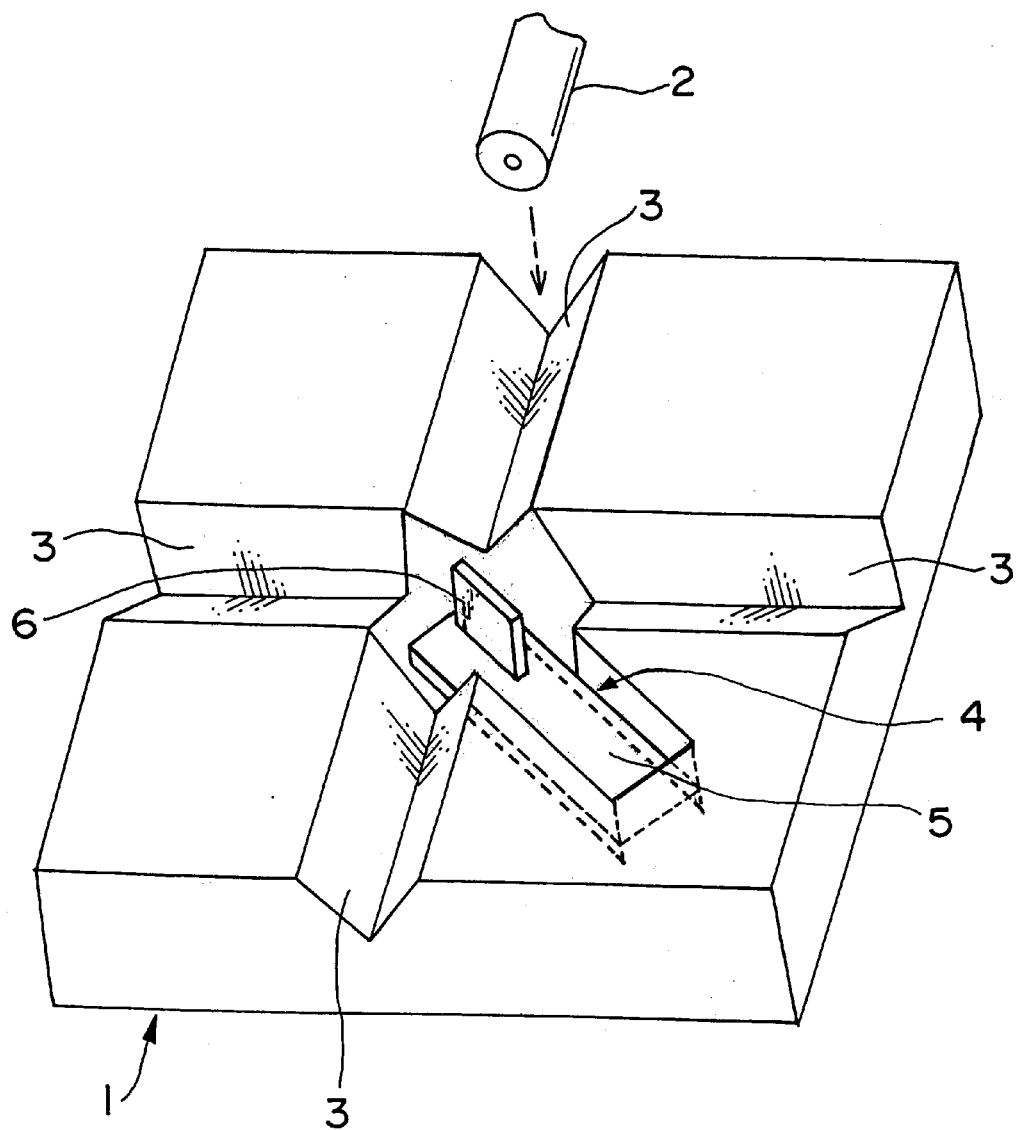
FIG. 1 is a perspective view illustrating a certain form of embodiment of the mechanical optic switch according to the present invention.

Hereinafter, the present invention will be described in detail with respect to forms of embodiments thereof illustrated in the drawing figures.

Figure 2:
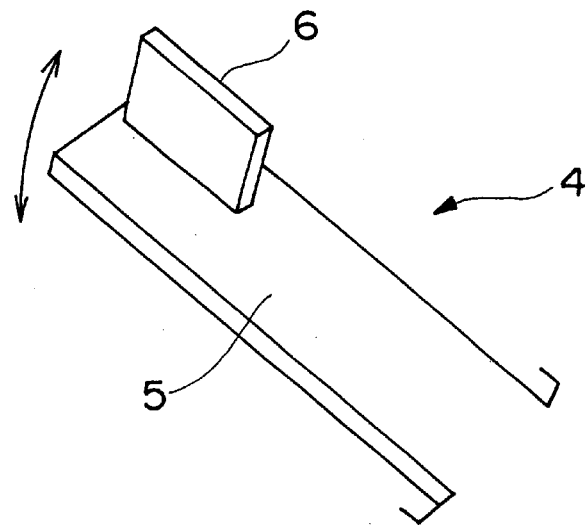
FIG. 2 is an enlarged perspective view of a movable mirror as shown in FIG. 1.
Figure 3:
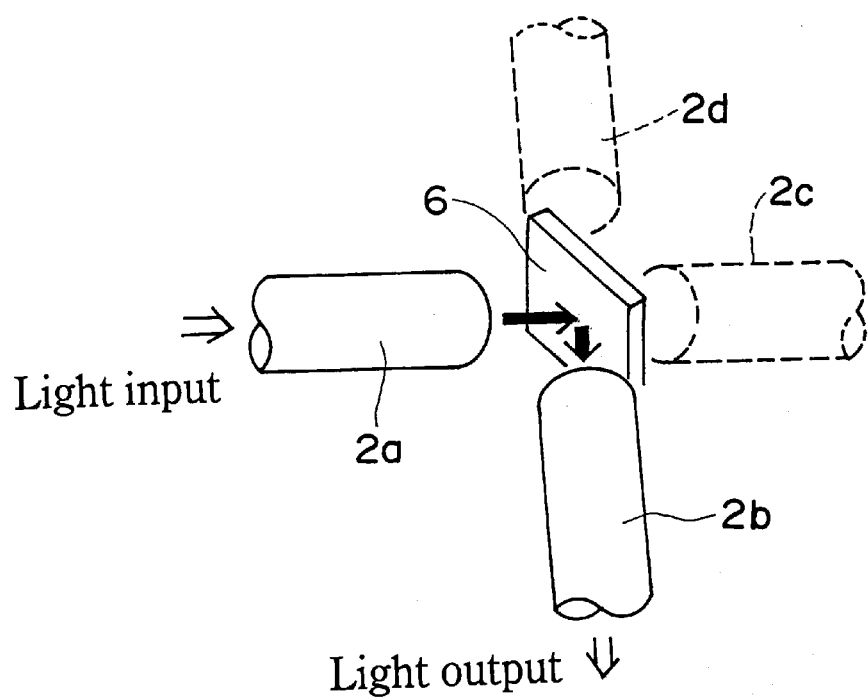
FIG. 3 is a perspective view illustrating a vertical mirror when interposed in a given optical path.
Figure 4:
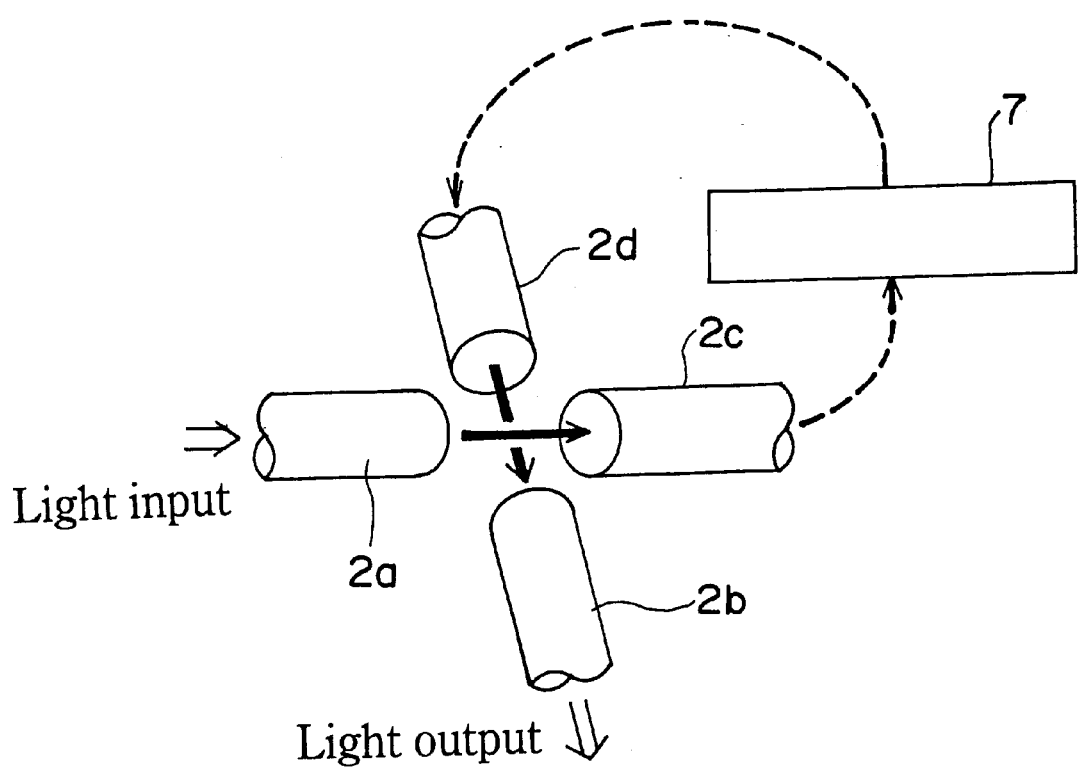
FIG. 4 is a perspective view illustrating the vertical mirror when brought out of the optical path.

FIG. 1 shows one form of embodiment of a mechanical optic switch according to the present invention. It includes a silicon single crystal substrate 1 that has V-grooves 3 and a movable mirror 4 formed simultaneously by a crystallographically oriented face dependent etching process, each of the V-grooves being for fixing or anchoring an optical fiber 2 thereon. The movable mirror 4 as shown in FIG. 2 comprises an resilient support constituted by a support beam (cantilever beam) 5 and a vertical mirror 6 that is located at a (free) end portion of this resilient support, and is so designed that the resilient support is flexed or deflected by a magnetic force, an electrostatic force or a force accompanying thermal expansion to move the vertical mirror 6 upwards or downwards. And, as shown in FIG. 3, when the vertical mirror 6 is interposed in optical paths for optical fibers 2a, 2b, 2c, 2d, a light introduced into the optical fiber 2a is directed via the vertical mirror 6 towards the optical fiber 2b. Alternatively, if the vertical mirror 6 is brought out of the optical paths as shown in FIG. 4, the light introduced through the optical fiber 2a a is directed via the optical fiber 2c, any separate optical device or apparatus 7 and the optical fiber 2d towards the optical fiber 2b. Thus, a switching operation is fulfilled.

An explanation is next given in respect of a method of making a form of embodiment as described above.

According to the present invention, a mechanical optic switch with a mirror surface that is of high quality and the optical axes of a mirror and an optical fiber which are self-aligned can be manufactured by performing a crystallographically oriented face dependent etching process using a single level mask for a Si (100) crystallographically faced wafer. Moreover, this process can be carried out at an extremely low cost.

This method of manufacture has the three features described below, which are derived from making the best use of advantages of bulk micromachining.

1. The <100> and <110> crystallographic directions that intersect at the angle of 45 degrees in a Si (100) crystallographically faced wafer which are used in forming a vertical mirror and a V-groove. A vertical wall that is under-etched in the <100> crystallographic direction is used as the mirror while at the same time the V-groove is formed in the <100> crystallographic direction of the Si wafer for aligning an optical fiber.

2. This mirror has a surface facing strictly perpendicular to the <100> crystallographic direction, thus minimizing the optical loss.

3. The selectivity of etching for the (111) crystallographic face is used for making up (determining) the depth of the V-groove and the height of the mirror, i.e., the two different structural depths. This is because the width of the V-groove that is set in the layout of masking determines the etching depth of the V-groove, thus defining the height of the optical axis for the optical fiber. Etching is caused to continue, continuously for the (100) face until a thickness of the support beam (cantilever beam) that is required for the mirror to work is reached. While using this characteristic, the position of the mirror surface and the thickness of the cantilever beam can be varied as desired with respect to the height of the optical axis of the V-groove determined in the layout of masking.

Figure 5:
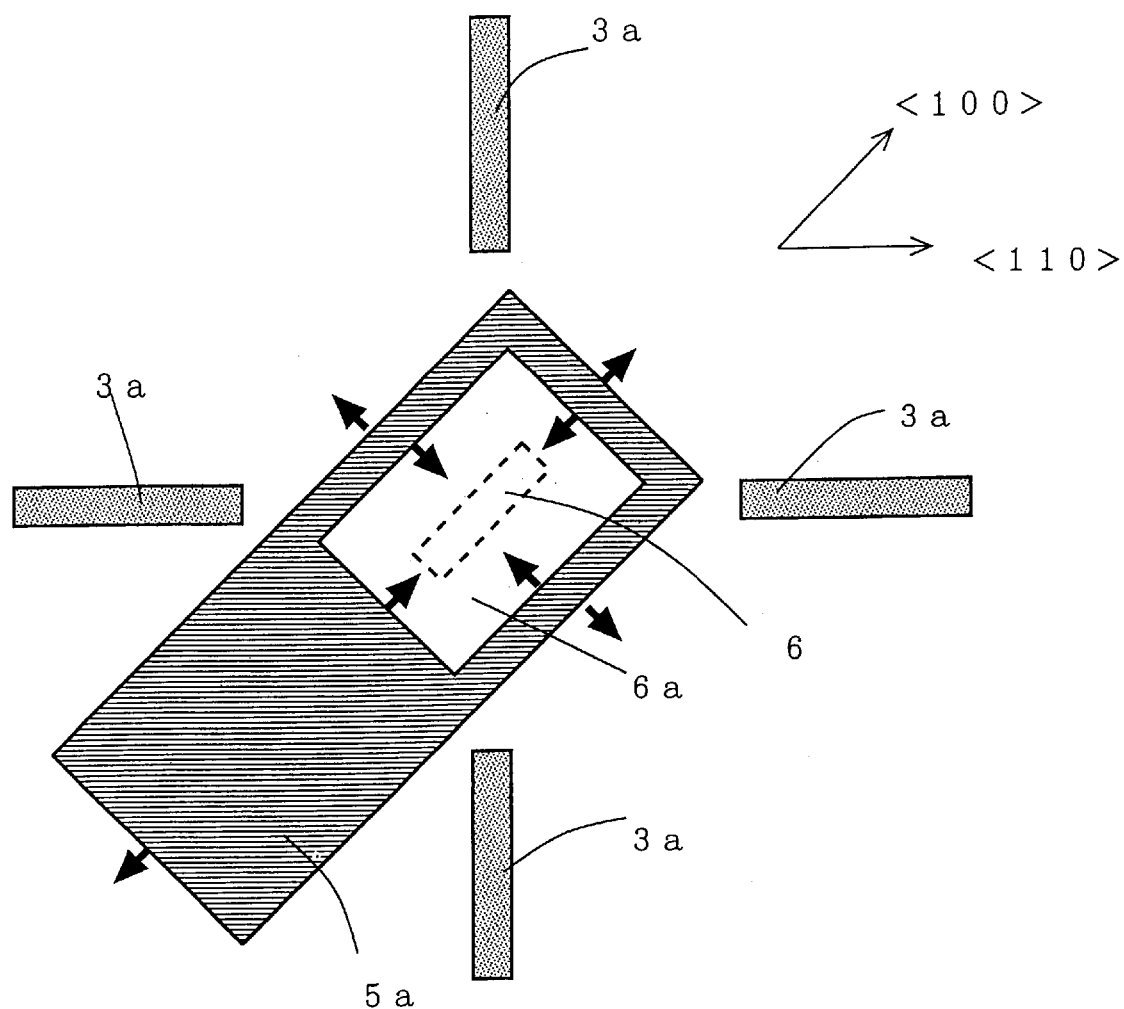
FIG. 5 is a view illustrating an etching mask pattern for use in one form of embodiment of the present invention and also the directions in which the crystallographically oriented face dependent etching process can be performed.

FIG. 5 is a view showing an etching mask pattern for use in the form of embodiment illustrated and also the directions in which the crystallographically oriented face dependent etching process is performed here. In FIG. 5, the surface is the Si (100) crystallographic face or a face equivalent thereto. The areas left white indicate the regions that are masked on the Si (100) crystallographic face. Reference character 3a designates an open pattern (area to be etched) for each of the V-grooves, of which the longitudinal axis is oriented in the Si <110> crystallographic direction or in a direction equivalent thereto.

Reference character 5a denotes a rectangular open pattern where the resilient support 5 is to be formed. The rectangular open pattern 5a has one side oriented in the <100> crystallographic direction or in a direction equivalent thereto and the other side perpendicular to that side. Reference character 6a indicates a rectangular masking pattern (pattern masked against etching) for mirror forming. The rectangle 6a is smaller than the rectangle 5a, and is disposed to have its center falling on a center position of the mirror and its sides parallel to the sides of the rectangle 5a.

Etching using the etching mask pattern constructed as mentioned above and using a crystallographic face orientation dependent etching process liquid produces etchings for the V-grooves in the areas of the open patterns 3a according to the crystallographic (111) face orientation dependent etching process action and each with the width and depth determined by the V-groove etching pattern, and then terminates etching.

In the area of the rectangular open pattern 5a, etching proceeds as indicated as hatched according to the crystallographic (100) face orientation dependent etching action perpendicularly to the (top) surface of the single crystal substrate while spreading as indicated by the arrows parallel to the (top) surface of the single crystal substrate, thereby forming (100) face and its equivalent etching exposed surfaces, which lie perpendicular to the substrate surface. A surface left inside of the rectangular masking pattern 6a for mirror forming constitutes a mirror surface. Thus, etching is terminated when the portion left unetched inside of the mask pattern 6a becomes of a target shape, providing for the mirror 6 of a form as desired.

While in the areas of the open patterns 3a for the V-grooves, the V-grooves are formed in the meantime, having surfaces composed of the (111) face and a face equivalent thereto according to the crystallographic face orientation dependent etching principle, it should be noted that the continued etching process required longer in time to form the mirror as mentioned above does not affect the V-grooves formed where etching stops when the etching depth determined by the width of the open pattern 3a is reached. Further, while the thickness of the resilient support 5 is established at a moment when it comes to a conclusion to form the mirror by etching in the direction perpendicular to the substrate surface in the area of the open pattern 5a, the resilient support 5 is rendered capable of flexure by slitting in the mean time from the rear of the single crystal substrate, i.e., slitting the periphery of that area corresponding to that of the resilient support 5 except a side or area becoming the base of the resilient support 5 where it is connected to and supported from the substrate. Consequently, resilient cantilever beams can be formed in this way.

Etching in the area of the rectangular open pattern 5a also spreads out sideways (or horizontally) to reach the V-grooves 3a. This makes it possible to make ends of the V-grooves open towards the mirror surfaces.

A mechanical fiber optic switch having an resilient cantilever beam with a desired modulus of elasticity and a desired mirror configuration can thus be built by suitably designing the V-grooves, the resilient support and the mirror as regards their etching mask pattern configurations and sizes in accordance with desired performance characteristics of the optic switch.

According to the method mentioned above, the V-grooves and the mirror are self-aligned opto-axially in accordance with their crystallographic face orientations.

Figure 6:
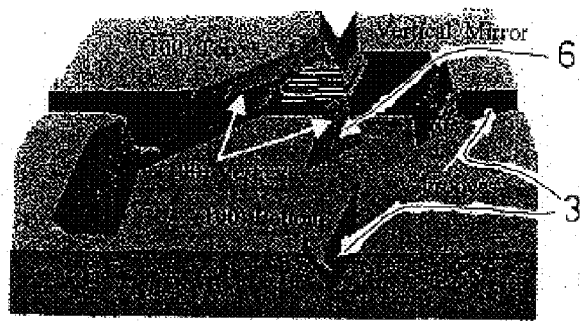
FIG. 6 is a view illustrating results of a CAD simulation of the crystallographically oriented face dependent etching process in the form of embodiment shown in FIG. 5.

Results of simulating a bypass switch as an application of this optic switch by using a CAD process simulation software are shown in FIG. 6.

Mention is made below of the mechanical optic switch actually prepared.

Figure 7:
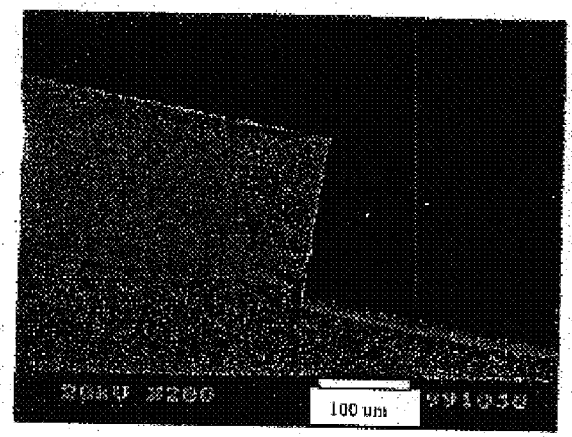
FIG. 7 is a view indicating that the crystal (100) face orientation dependent etching process has produced a vertical etched surface.

FIG. 7 shows a vertical sidewall and a mirror in a (100) silicon wafer.

Figure 8:
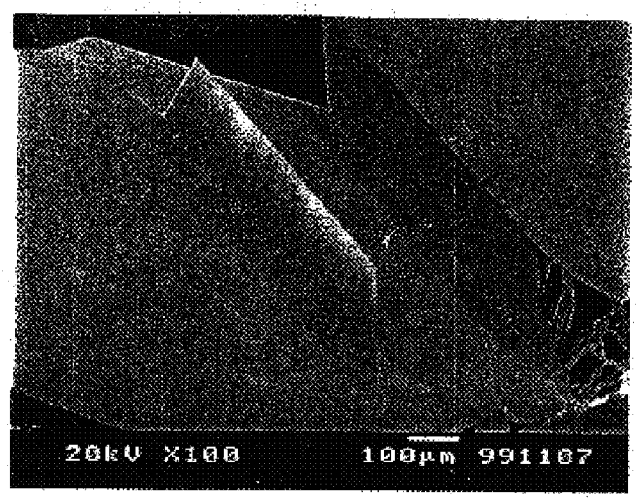
FIG. 8 is a view indicating that the crystal (100) face orientation dependent etching process has produced a vertical etched surface and a vertical a side wall that is perpendicular thereto.
Figure 9:
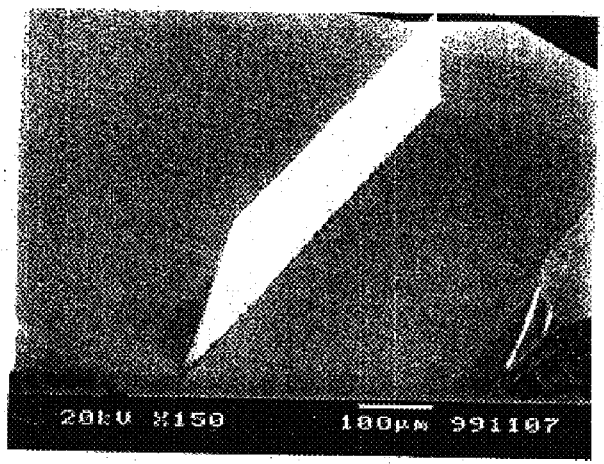
FIG. 9 is a view illustrating an example in which a mirror is formed having a thickness of 2 to 3 m.

Since each of the bottom and sidewall surfaces consists of the same {100} class, the lateral and vertical etching speeds are identical to each other. This indicates that the method can form a vertical mirror. An example of such a mirror during etching is shown in FIG. 8. The mirror has a thickness which as is seen from FIG. 9 can be reduced to as low as several micrometers. A structure having a length of 3 mm, a height of 200 $\mu$m and a width of 3 $\mu$m or less can easily be achieved. In order to build a bypass switch, it is critical to make the mirror extremely thin so as to make small as much as possible the loss of light between one optical path and another. For example, in a fiber optic switch that also utilizes reflection by the rear surface as a mirror surface of the conventional mirror, it has inconveniently been customary to make a correction for the position where the optical fiber is to be disposed in considering the thickness of the mirror in order to reduce the loss entailed to couple one optical path to another. The need for such a correction is eliminated by the use of the method of the invention that can make the mirror extremely small in thickness.

Figure 10:
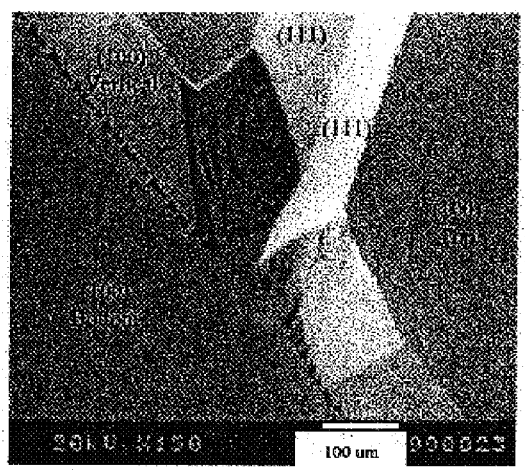
FIG. 10 is a view illustrating a difference in height between a V-groove and a resilient support beam.

An example of forming two structural depths varied in level for switching operation by utilizing the (111) face selective etching (i.e., crystallographically oriented face dependent etching) is shown in FIG. 10.

Figure 11:
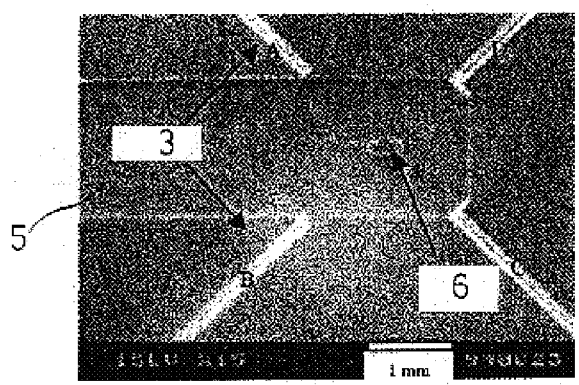
FIG. 11 is a view illustrating an optical arrangement of the form of embodiment illustrated as seen midway in the etching.

FIG. 11 shows a self-aligned optical structure for a bypass switch midway through etching (using masks of the layout shown in FIG. 5). To avoid over-etching of the V-grooves, the V-grooves A, B, C and D are not connected to the mirror when the masking is laid out. It is only at the conclusion of etching that the V-grooves are made open to the mirror. Although over-etching is not fatal to a switching operation, restraining the over-etching makes it possible to place holders for optical fibers closer to the mirror. The V-grooves become open to the mirror just at the end of the etching process.

Figure 12:
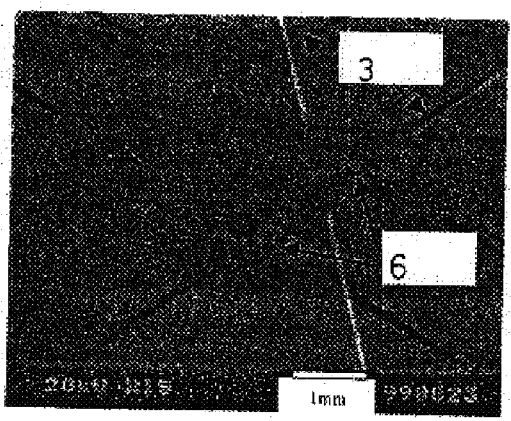
FIG. 12 is a view illustrating another form of embodiment of the present invention.

This etching principle can be applied to building up an M×N matrix switch. An example of the optical structure for a matrix switch is shown in FIG. 12.

Furthermore, the mechanical optic switch according to the present invention can be manufactured by a method as described below.

Figure 13:
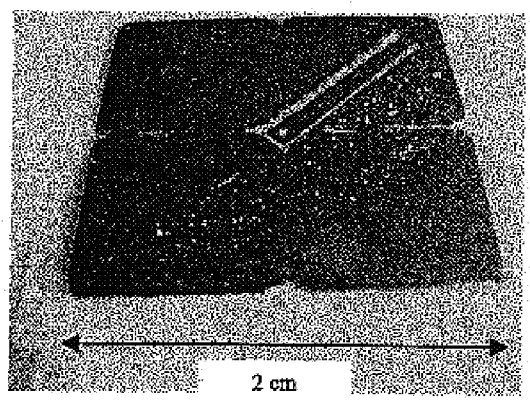
FIG. 13 is a view showing the appearance of a substrate after a resilient support beam has been formed in the form of embodiment illustrated.
Figure 14:
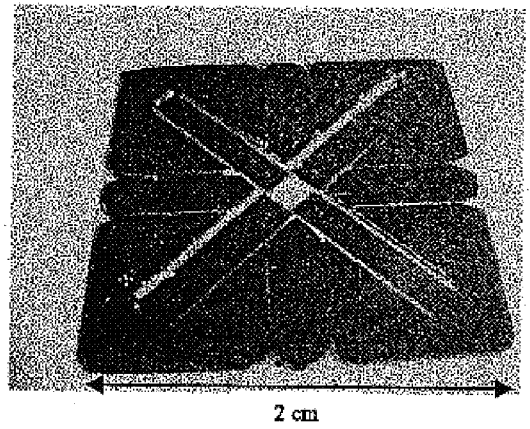
FIG. 14 is a view illustrating another form of embodiment of the invention in which a plurality of resilient support beams are provided.

A crystallographically (100) faced silicon wafer is commenced with as the substrate. After washing, a wet oxidizing process oxidizes the silicon wafer and forms its surfaces with a film of silicon dioxide of 0.5 m. The silicon dioxide film on the top substrate surface is then processed to bear the etching mask pattern for forming the optical structure, and the silicon dioxide film on the rear substrate surface is processed to bear an etching mask pattern for slitting to form the resilient support beam (cantilever beam). After the top substrate surface is protected against corrosion, a first etching step is carried out from the rear surface of the substrate to form the resilient support therein in a manner such that a depth of slitting into the Si substrate provides a predetermined thickness of the resilient support beam (cantilever beam). A next etching step is then carried out from the top surface of the substrate to form the optical structure therein. This process step is allowed to proceed while controlling the thickness of the mirror being formed. Just at the conclusion of the process step, the bottom surface comes into communication with the slits formed by etching from the rear substrate surface, and the cantilever finishes completed as well. Then, vacuum deposition is performed to deposit a layer of Cr/Au on the mirror surface. FIGS. 13 and 14 illustrate an entire image of the bypass and matrix switch.

Etching makes use of an aqueous solution containing 20 to 30% of potassium hydroxide (KOH) and is performed at a temperature of 60 to 80°. Etching proceeds at a speed of about 1 μm/sec.

Mention is made next of the use of magnetic force as an example to drive the mechanical optic switch according to the present invention.

A bistable operating system operated electromagnetically has been developed, which advantageously does not require power consumption to maintain the mirror at its on and off positions.

Figure 15:
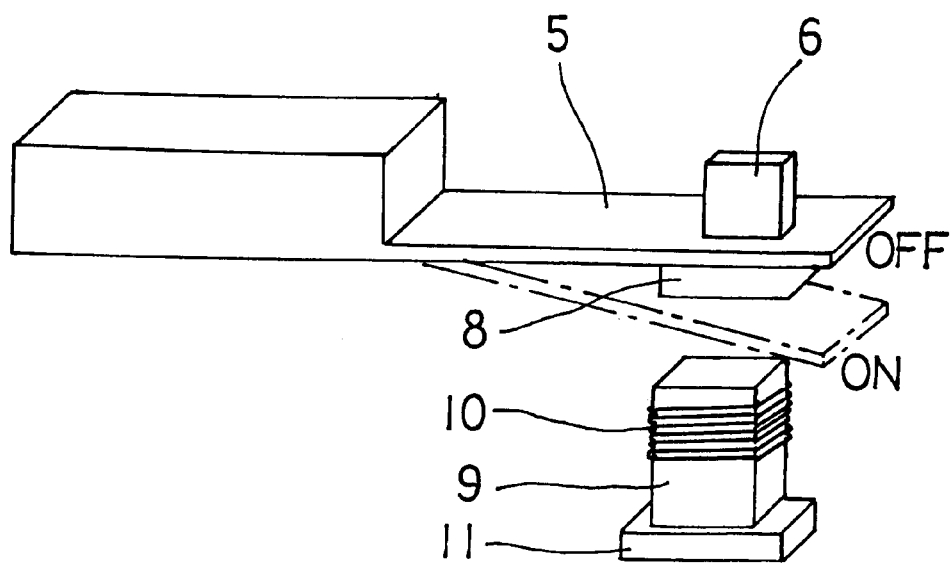
FIG. 15 is a view illustrating a form of embodiment for driving a resilient support beam.

The drive of this system includes two parts separated from each other by an air gap (see FIG. 15).

1. A movable, monolithic silicon component comprising a vertical mirror 6 and a flexible resilient support 5, the latter having a magnetized permalloy leaf 8 of 100 μm thick attached to a top region thereof; and
2. A fixed small electromagnet comprising a yoke 9, a winding 10 and a permanent magnet 11 and made by the conventional technique.

Bistable actions of this system are obtained thanks to the mechanical position (OFF position) at which the stiffness of the resilient support 5 holds stabilization, and the second stable position (ON position) magnetically stabilized by the permanent magnet. Passing electric current through the winding effects a switching operation. Passing reversed electric current through the winding effects release from the ON position. The principles of this operation are illustrated in FIG. 15.

Figure 16:
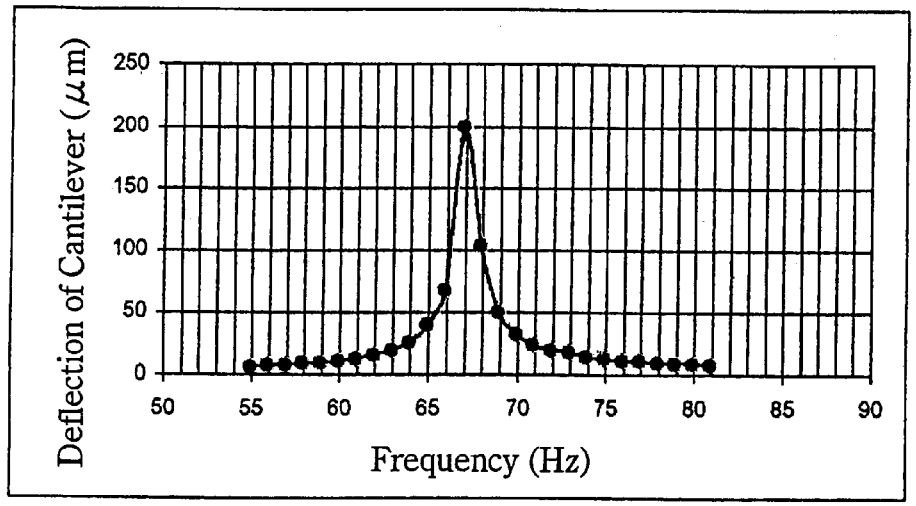
FIG. 16 is a diagram illustrating a frequency response of the resilient support beam.

An example is illustrated below in which the abovementioned principles are applied to a bypass switch as shown in FIG. 3. The resilient support beam (cantilever beam) and the permalloy leaf have their sizes of 11.7 mm×1.2 mm×20 μm and 1 mm×1 mm×100 μm, respectively. The yoke, made of iron, has its size of 6 mm×6 mm×10 mm and has 300 turns of the winding wound thereon. The resilient support beam is driven supplied with a sinusoidal electric current. Its frequency response is measured using a vibration meter and is depicted in FIG. 16. A resonant frequency is found to be 67.2 Hz and a quality factor to be 33 Hz.

Superimposing a magnetic filed generated by the winding 10 on the yoke and a magnetic field exerted by the permanent magnet 10 cause the resilient support beam 5 to move against its stiffness to the second stable position (ON position). As the filed strength is spatially gradient, it is greater at the second stable position (ON position) than at the first stable position (OFF position). Consequently, rendering the current off in the winding 10 on the yoke still leaves the resilient support beam 5 to stay at the second stable state. Drawing current reversed in direction through the winding 10 on the yoke returns the resilient support beam 5 to the first stable position on the yoke.

Figure 17:
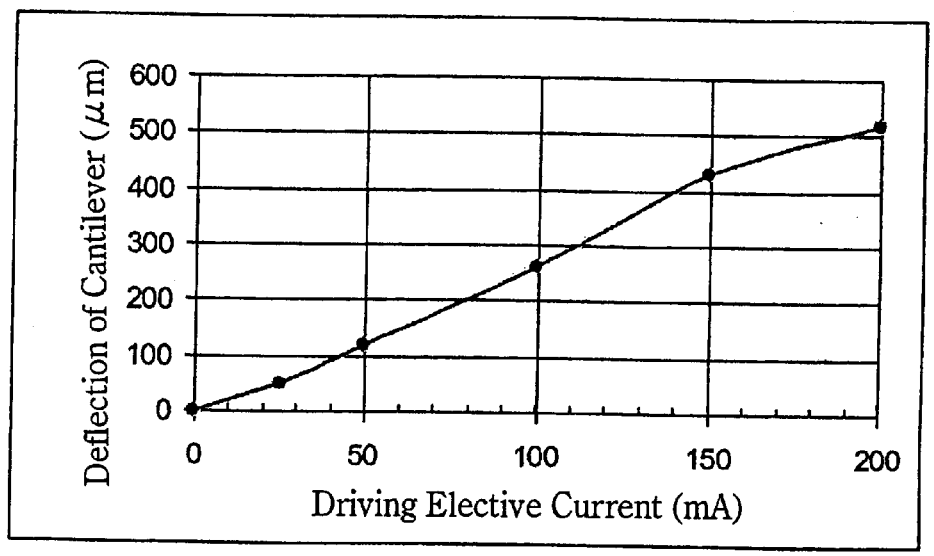
FIG. 17 is a diagram illustrating relationship between electric current passed through the drive coil and flexure of the resilient support beam in the form of embodiment illustrated.

FIG. 17 shows relationship between the magnitude of electric current applied and the amount of deflection of the resilient support beam.

A single- and a multi-mode fiber have their sizes of 9 μm and 50 μm, respectively. Then, assuming that the mirror has a maximum displacement of 100 μm corresponding to enough height for an accurate switching to be effected, the power consumption will be less than 10 mW.

Optical switching was performed with light having an infrared wavelength of 1.55 μm. A first result was obtained using multi-mode fibers. A light beam had a diameter that is smaller than the mirror size (100 μm×200 μm that ensures perfect ON/OFF operations of the optical beam). The optical loss had measured values of 0.46 dB and 0.53 dB at the ON and OFF positions, respectively.

Figure 18:
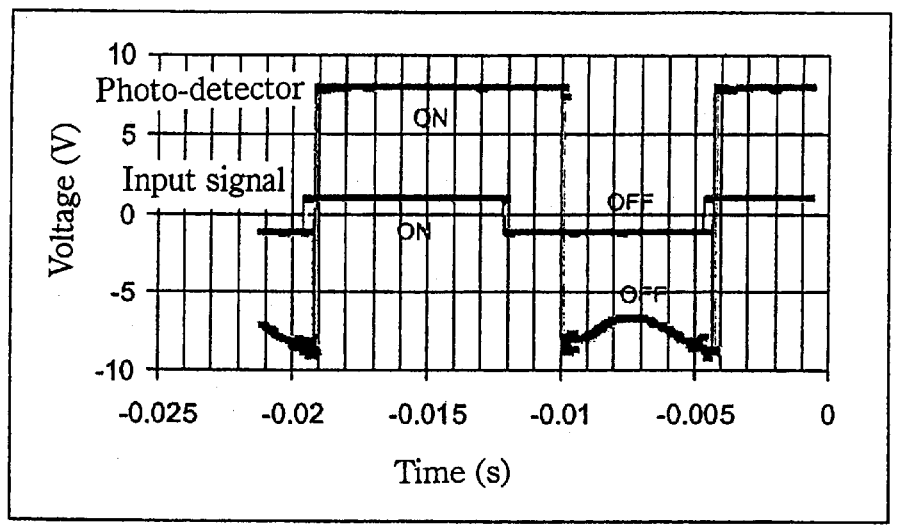
FIG. 18 is a diagram illustrating a delay time in the on and off optical switching operation in the form of embodiment illustrated.

The dynamic response was measured for the switch by means of a silicon made photo detector using a semiconductor laser source operating at a visible light wavelength of 633 nm. A typical oscilloscopic trace of the switch response is depicted in FIG. 18. The rise time is 0.4 ms, corresponding to the movement of the cantilever shifting to the ON position. The fall time is 2 ms, representing the cantilever returning to the OFF position. These two values include a light switching and a delay time between light deflection and switching in a set. Accordingly, if the height of the fibers is optimized with respect to the mirror, it is estimated from the extremely steep gradient shown in FIG. 18 that a switching time in the order of sub-milliseconds (>500 μs) can be reached.

Experiments for determining the lifetime under inquiry were conducted. After 20,000,000 times of switching operations, no deterioration in switching performance was detected.

The operating mechanism of the self-hold system that holds the switch at the ON position without additional current has been established as well. An electric current of 0.5 ampere is required to turn the switch on and off. As a postscript, this system has not yet been optimized.

Characteristics of the Matrix Switch

Figure 19:
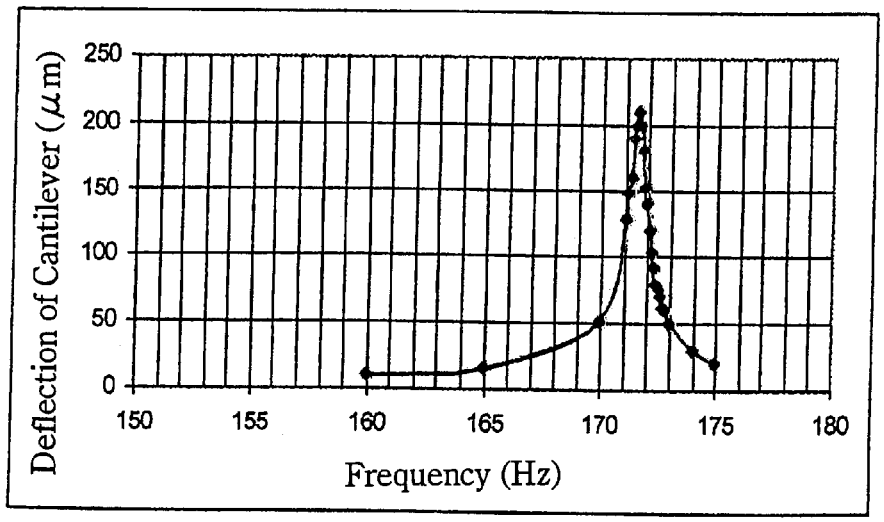
FIG. 19 is a diagram illustrating a frequency response of one of resilient support beams in a matrix switch.

Results first obtained for the matrix switch shown in FIG. 14 have been reported, too. The resilient support beam (cantilever) is shorter than the bypath length (8.8 mm). Consequently, the resonant frequency is as high as 170 Hz as depicted in FIG. 19.

Figure 20:
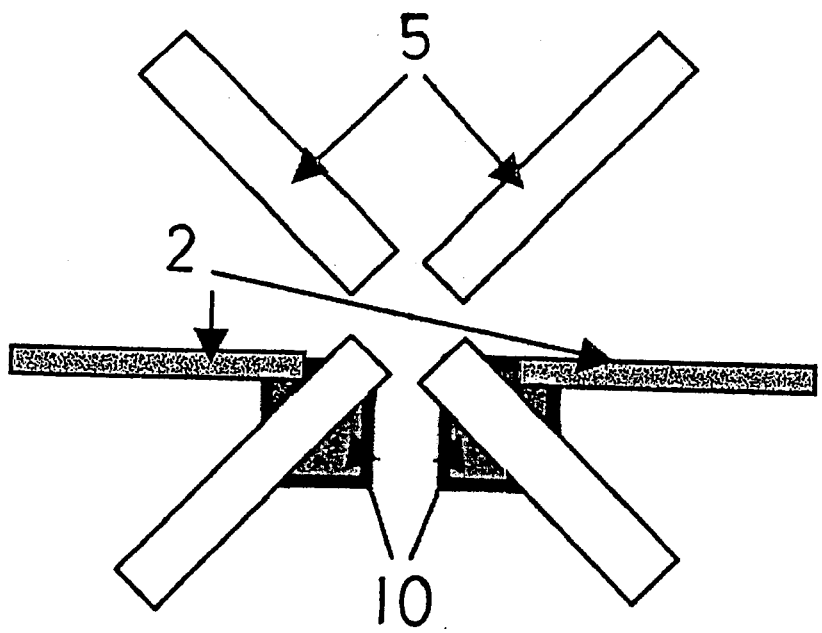
FIG. 20 is a structural diagram of a matrix switch used to investigate an interaction between resilient support beams.

A multi-mode fiber was first used for the measurement of the insertion loss between fibers 2 shown in FIG. 20. The insertion loss is high (>10 dB), and this result is due to long working distance (2.8 mm). As a next step, using a fiber provided with a grating index switch at an end thereof will dramatically decrease the insertion loss. An insertion loss lower than 1.5 dB can be expected. Another method to reduce the insertion loss is to decrease the distance between the mirrors.

A structural diagram of the matrix switch used to investigate the interaction between the adjacent cantilevers is shown in FIG. 20. A winding is placed below each of the cantilevers for driving the same. This system must be designed so that driving one cantilever by its associated winding may not affect a cantilever that is adjacent thereto. To investigate such interaction, an electric current was applied to one winding and the deflection of the cantilever was measured by a laser vibrometer at each of the ends thereof. These deflections were found to be 280 μm and 7 μm. Since a displacement of 100 μm is sufficient for switching, it has been confirmed that its influence on any other cantilever is sufficiently small as to achieve the aim mentioned above.

In accordance with the present invention, a novel method is brought to realization for building up with ease and at low cost a mechanical fiber optic switch and a M×N matrix switch as an application thereof, by using a Si crystallographically oriented face dependent etching process. This method has the key distinctive features that it obtains a self-aligned vertical mirror and V-groove assembly and that its mirror is strictly vertical or perpendicular opto-axially. These two key features are obtained thanks to crystal lattices in a single crystal substrate.

Using this method, bypass and matrix switches for an optical network can be produced. A mirror displacement of 100 m can be achieved with an energy consumption as low as less than 10 mW. A minimum switching time of 2 ms has so far been obtained and, if dimensioning the height of the fibers and mirror is optimized, that is expected to reach 500 μm or less. The frequency of operation has been proven at 67 Hz and 171 Hz and can be made higher with the cantilever that is made shorter. The insertion loss has been found to be 0.46 dB and 0.53 dB at the ON and OFF positions, respectively.

A self-hold system using electromagnetic forces has been developed, and it has been demonstrated that self-holding essentially requires no energy consumption. A switching operation is provided simply by passing an electric current through a winding.

These derived effects of the novel switch upon its further design optimization and structural improvement are anticipated to be extended to a matrix switch as well that is larger in size.

Industrial Applicability

As will be appreciated from the foregoing description, the present invention provides a mechanical optic switch that can be used as a fiber optic switch which is extremely small in insertion loss.

The present invention also provide a method of manufacture that can be employed to produce at an extremely low production cost a fiber optic switch that is extremely low in insertion loss.

The present invention can most advantageously be adopted in building a fiber optic communication network.

What is claimed is:

1. A mechanical optic switch, characterized in that it comprises a plurality of single layer v-groove for fixing an optical fiber on a surface of a single crystal substrate, and a mirror being vertically movable to said surface, wherein said single layer V-groove and said mirror are those formed simultaneously in said single crystal substrate in accordance with a crystallographically oriented face dependent etching process.

2. A mechanical optic switch as set forth in claim 1, characterized in that said movable mirror comprises a resilient support beam capable of flexing and a mirror made integrally with said resilient support beam.

3. A mechanical optic switch as set forth in claim 2, characterized in that said V-groove is formed of a Si (111) crystallographic face and said mirror has a mirror surface formed of a Si (100) crystallographic face.

4. A mechanical optic switch as set forth in claim 2, characterized in that said movable mirror has a permanent magnetic disposed on a rear surface of said resilient support beam capable of flexing, and a drive coil or a yoke including drive coil that is disposed beneath said permanent magnet and adapted to be supplied with an electric current to create a magnetic field for driving said movable mirror.

5. A mechanical optic switch as set forth in claim 4, characterized in that adding a second permanent magnet to said yoke including drive coil establishes a pair of stable positions for said resilient support beam having the permanent magnet disposed on the rear surface thereof, and that directionally reversing the electric current passed through said coil selectively establishes one of said two stable positions.

6. A method of manufacturing a mechanical optic switch, characterized in that it comprises applying a crystallographically oriented face dependent etching process to simultaneously form in a Si (100) crystallographically faced single crystal substrate, a single layer V-groove for fixing an optical fiber and a movable mirror made of an resilient support beam and a mirror.

7. A method of manufacturing a mechanical optic switch as set forth in claim 6, characterized in that said crystallographically oriented face dependent etching process is performed after there has been formed on said Si (100) faced single crystal substrate, an etching mask pattern comprising a region of rectangular open pattern for said resilient support beam, a region of rectangular masking pattern in said region of rectangular open pattern for said mirror, and a plurality of regions of open pattern for such V-grooves as aforesaid.

8. A method of manufacturing a mechanical optic switch as set forth in claim 7, characterized in that said region of rectangular open pattern for the resilient support beam and said region of rectangular masking pattern in said region of rectangular open pattern for said mirror are each of a rectangle lying in a (100) crystallographic plane and having one side oriented in a <100> crystallographic direction or in a direction equivalent thereto and other side perpendicular to said one side.

9. A method of manufacturing a mechanical optic switch as set forth in claim 7, characterized in that said plurality of regions of open pattern for V-grooves are each a region of rectangular open pattern lying in the (100) crystallographic plane and having a longitudinal axis oriented in the <100> crystallographic direction or in a direction equivalent thereto and are each arranged having said longitudinal axis directed towards a center of said region of masking pattern for said mirror and are so arranged as to surround said region of rectangular open pattern for said resilient support beam.

10. A method of manufacturing a mechanical optic switch as set forth in claim 6, characterized in that a slit corresponding in shape and depth to the shape and thickness of said resilient support beam is made by etching from a rear surface of said single crystal substrate to render said support beam resilient and capable of flexing.

11. A mechanical optic switch, characterized in that it comprises a groove for fixing an optical fiber, and a movable mirror, wherein said groove and said mirror are those formed simultaneously in a single crystal substrate in accordance with a crystallographically oriented face dependent etching process;

said groove for fixing an optical fiber is a V-groove, and said movable mirror comprises a resilient support beam capable of flexing and a mirror made integrally with said resilient support beam;

said movable mirror has a permanent magnetic disposed on a rear surface of said resilient support beam capable of flexing, and a drive coil or a yoke including drive coil that is disposed beneath said permanent magnet and adapted to be supplied with an electric current to create a magnetic field for driving said movable mirror;

wherein adding a second permanent magnet to said yoke including drive coil establishes a pair of stable positions for said resilient support beam having the second permanent magnet disposed on the rear surface thereof, and that directionally reversing the electric current passed through said coil selectively establishes one of said two stable positions.

12. A method of manufacturing a mechanical optic switch, characterized in that it comprises applying a crystallographically oriented face dependent etching process to simultaneously form in a Si (100) crystallographically faced single crystal substrate, a V-groove for fixing an optical fiber and a movable mirror made of an resilient support beam and a mirror;

wherein said crystallographically oriented face dependent etching process is performed after there has been formed on said Si (100) faced single crystal substrate, an etching mask pattern comprising a region of rectangular open pattern for said resilient support beam, a region of rectangular masking pattern in said region of rectangular open pattern for said mirror, and a plurality of regions of open pattern for such V-grooves as aforesaid.

* * * * *